United States Patent
Strandborg et al.

(10) Patent No.: US 11,727,658 B2
(45) Date of Patent: Aug. 15, 2023

(54) USING CAMERA FEED TO IMPROVE QUALITY OF RECONSTRUCTED IMAGES

(71) Applicant: Varjo Technologies Oy, Helsinki (FI)

(72) Inventors: Mikko Strandborg, Hangonkylä (FI); Petteri Timonen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 193 days.

(21) Appl. No.: 17/492,213

(22) Filed: Oct. 1, 2021

(65) Prior Publication Data
US 2023/0108922 A1 Apr. 6, 2023

(51) Int. Cl.
| | | |
|---|---|---|
| G06T 19/20 | (2011.01) | |
| G06T 17/00 | (2006.01) | |
| G06T 7/50 | (2017.01) | |
| G06T 7/70 | (2017.01) | |
| G06F 3/0346 | (2013.01) | |

(52) U.S. Cl.
CPC ............ *G06T 19/20* (2013.01); *G06F 3/0346* (2013.01); *G06T 7/50* (2017.01); *G06T 7/70* (2017.01); *G06T 17/00* (2013.01); *G06T 2219/2008* (2013.01)

(58) Field of Classification Search
CPC .. G06T 19/20; G06T 7/50; G06T 7/70; G06T 17/00; G06T 2219/2008; G06F 3/0346
See application file for complete search history.

(56) References Cited

U.S. PATENT DOCUMENTS

| | | | | |
|---|---|---|---|---|
| 10,116,913 | B2* | 10/2018 | Kim | G16B 25/00 |
| 11,232,633 | B2* | 1/2022 | Lee | G06T 19/20 |
| 11,276,201 | B1* | 3/2022 | Garcia Sopo | G06T 7/73 |
| 11,501,492 | B1* | 11/2022 | Li | H04N 23/698 |
| 2012/0162384 | A1* | 6/2012 | Vesely | G06T 19/006 348/47 |
| 2014/0206443 | A1* | 7/2014 | Sharp | G06T 7/593 463/31 |
| 2014/0218360 | A1* | 8/2014 | Dalgaard Larsen | G06T 15/20 345/420 |
| 2017/0243352 | A1* | 8/2017 | Kutliroff | G06T 19/006 |
| 2018/0130255 | A1* | 5/2018 | Hazeghi | H04N 13/243 |
| 2018/0157455 | A1* | 6/2018 | Troy | B64F 5/10 |

(Continued)

*Primary Examiner* — Jitesh Patel
(74) *Attorney, Agent, or Firm* — Ziegler IP Law Group, LLC (57) ABSTRACT

A system including server(s) configured to: receive, from host device, visible-light images of real-world environment captured by visible-light camera(s); process visible-light images to generate three-dimensional (3D) environment model; receive, from client device, information indicative of pose of client device; utilise 3D environment model to generate reconstructed image(s) and reconstructed depth map(s); determine position of each pixel of reconstructed image(s); receive, from host device, current visible-light image(s); receive, from host device, information indicative of current pose of host device, or determine said current pose; determine, for pixel of reconstructed image(s), whether or not corresponding pixel exists in current visible-light image(s); replace initial pixel values of pixel in reconstructed image(s) with pixel values of corresponding pixel in current visible-light image(s), when corresponding pixel exists in current visible-light image(s); and send reconstructed image(s) to client device.

18 Claims, 3 Drawing Sheets

(56) References Cited

U.S. PATENT DOCUMENTS

2018/0314877 A1* 11/2018 Srivastava ............. G06V 20/64
2021/0263515 A1* 8/2021 Henry .................. G05D 1/0094
2022/0122328 A1* 4/2022 Giovannetti ............. G06T 7/70

* cited by examiner

USING CAMERA FEED TO IMPROVE QUALITY OF RECONSTRUCTED IMAGES

TECHNICAL FIELD

The present disclosure relates to systems for improving quality of reconstructed images. The present disclosure also relates to methods for improving quality of reconstructed images.

BACKGROUND

In recent times, there has been an ever-increasing demand for image generation and processing. For example, such a demand may be quite high and critical in case of evolving technologies such as immersive extended-reality (XR) technologies which are being employed in various fields such as entertainment, real estate, training, medical imaging operations, simulators, navigation, and the like. Several advancements are being made to develop image generation and processing technology.

Typically, three-dimensional (3D) models (for example, in form of 3D polygonal mesh, 3D point cloud, 3D grid, and the like) of real-world environments are generated and are subsequently employed as input for generating images to be displayed at display devices. Presently, the 3D models are limited in terms of representing visual details of the real-world environments with a high granularity (namely, high resolution), due to limited processing resources, limited processing complexity, and the like, being used for generation of the 3D models. Thus, the 3D models only include generic (i.e., coarse) visual details of the real-world environments, and not fine details such as text, patterns, textures, and the like. As an example, when a 3D model is in the form of a 3D point cloud, a maximum point cloud density (namely, a number of points per unit area in the 3D point cloud) is limited due to available processing resources of a Graphics Processing Unit (GPU). In such an example, a granularity of the 3D point cloud may be limited to 1 point per cubic centimetre (i.e., 1 point in the 3D point cloud may correspond to 1 cubic centimetre volume of an environment represented by the 3D point cloud), which is insufficient to represent fine details of said environment. Moreover, visual quality of the images generated (i.e., reconstructed) using the 3D models entirely relies on a (limited) visual quality of the 3D models. Resultantly, the generated images have poor visual quality, thereby leading to a sub-optimal, non-immersive viewing experience for a user viewing said images.

Therefore, in light of the foregoing discussion, there exists a need to overcome the aforementioned drawbacks associated with generation and utilization of three-dimensional models for generating images.

SUMMARY

The present disclosure seeks to provide a system for improving quality of reconstructed images. The present disclosure also seeks to provide a method for improving quality of reconstructed images. An aim of the present disclosure is to provide a solution that overcomes at least partially the problems encountered in prior art.

In one aspect, an embodiment of the present disclosure provides a system comprising at least one server configured to:

receive, from a host device, a plurality of visible-light images of a real-world environment captured by at least one visible-light camera of the host device;

process the plurality of visible-light images to generate a three-dimensional environment model of the real-world environment, wherein the three-dimensional environment model is generated in a global coordinate space;

receive, from a client device, information indicative of a given pose of the client device in the global coordinate space;

utilise the three-dimensional environment model to generate at least one reconstructed image and at least one reconstructed depth map from a perspective of the given pose of the client device;

determine, based on the at least one reconstructed depth map and the given pose of the client device, a position of each pixel of the at least one reconstructed image in the global coordinate space;

receive, from the host device, at least one current visible-light image of the real-world environment captured by the at least one visible-light camera or at least one other visible-light camera of the host device;

receive, from the host device, information indicative of a current pose of the host device from which the at least one current visible-light image is captured, or determine, from the at least one current visible-light image and the three-dimensional environment model, the current pose of the host device from which the at least one current visible-light image is captured, wherein the current pose of the host device is in the global coordinate space;

for a given pixel of the at least one reconstructed image, determine based on the current pose of the host device whether or not a corresponding pixel exists in the at least one current visible-light image whose position in the global coordinate space matches with the position of the given pixel of the at least one reconstructed image;

replace initial pixel values of the given pixel in the at least one reconstructed image with pixel values of the corresponding pixel in the at least one current visible-light image, when the corresponding pixel exists in the at least one current visible-light image; and send the at least one reconstructed image to the client device for display thereat.

In another aspect, an embodiment of the present disclosure provides a method comprising:

receiving, from a host device, a plurality of visible-light images of a real-world environment captured by at least one visible-light camera of the host device;

processing the plurality of visible-light images to generate a three-dimensional environment model of the real-world environment, wherein the three-dimensional environment model is generated in a global coordinate space;

receiving, from a client device, information indicative of a given pose of the client device in the global coordinate space;

utilising the three-dimensional environment model to generate at least one reconstructed image and at least one reconstructed depth map from a perspective of the given pose of the client device;

determining, based on the at least one reconstructed depth map and the given pose of the client device, a position of each pixel of the at least one reconstructed image in the global coordinate space;

receiving, from the host device, at least one current visible-light image of the real-world environment captured by the at least one visible-light camera or at least one other visible-light camera of the host device;

receiving from the host information indicative of a current pose of the host device from which the at least one current visible-light image is captured, or determining, from the at least one current visible-light image and the three-dimensional environment model, the current pose of the host device from which the at least one current visible-light image is captured, wherein the current pose of the host device is in the global coordinate space;

for a given pixel of the at least one reconstructed image, determining based on the current pose of the host device whether or not a corresponding pixel exists in the at least one current visible-light image whose position in the global coordinate space matches with the position of the given pixel of the at least one reconstructed image;

replacing initial pixel values of the given pixel in the at least one reconstructed image with pixel values of the corresponding pixel in the at least one current visible-light image, when the corresponding pixel exists in the at least one current visible-light image; and sending the at least one reconstructed image to the client device for display thereat.

Embodiments of the present disclosure substantially eliminate or at least partially address the aforementioned problems in the prior art, and enable generation of high-quality and realistic reconstructed images for the client device, by way using camera feed of the host device to improve resolution of these reconstructed images in pixels representing common real-world points/regions that are being viewed by both the client device and host device.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system comprising at least one server configured to:

receive, from a host device, a plurality of visible-light images of a real-world environment captured by at least one visible-light camera of the host device;

process the plurality of visible-light images to generate a three-dimensional environment model of the real-world environment, wherein the three-dimensional environment model is generated in a global coordinate space;

receive, from a client device, information indicative of a given pose of the client device in the global coordinate space;

utilise the three-dimensional environment model to generate at least one reconstructed image and at least one reconstructed depth map from a perspective of the given pose of the client device;

determine, based on the at least one reconstructed depth map and the given pose of the client device, a position of each pixel of the at least one reconstructed image in the global coordinate space;

receive, from the host device, at least one current visible-light image of the real-world environment captured by the at least one visible-light camera or at least one other visible-light camera of the host device;

receive, from the host device, information indicative of a current pose of the host device from which the at least one current visible-light image is captured, or determine, from the at least one current visible-light image and the three-dimensional environment model, the current pose of the host device from which the at least one current visible-light image is captured, wherein the current pose of the host device is in the global coordinate space;

for a given pixel of the at least one reconstructed image, determine based on the current pose of the host device whether or not a corresponding pixel exists in the at least one current visible-light image whose position in the global coordinate space matches with the position of the given pixel of the at least one reconstructed image;

replace initial pixel values of the given pixel in the at least one reconstructed image with pixel values of the corresponding pixel in the at least one current visible-light image, when the corresponding pixel exists in the at least one current visible-light image; and send the at least one reconstructed image to the client device for display thereat.

In another aspect, an embodiment of the present disclosure provides a method comprising:

receiving, from a host device, a plurality of visible-light images of a real-world environment captured by at least one visible-light camera of the host device;

processing the plurality of visible-light images to generate a three-dimensional environment model of the real-world environment, wherein the three-dimensional environment model is generated in a global coordinate space;

receiving, from a client device, information indicative of a given pose of the client device in the global coordinate space;

utilising the three-dimensional environment model to generate at least one reconstructed image and at least one reconstructed depth map from a perspective of the given pose of the client device;

determining, based on the at least one reconstructed depth map and the given pose of the client device, a position of each pixel of the at least one reconstructed image in the global coordinate space;

receiving, from the host device, at least one current visible-light image of the real-world environment captured by the at least one visible-light camera or at least one other visible-light camera of the host device;

receiving from the host information indicative of a current pose of the host device from which the at least one current visible-light image is captured, or determining, from the at least one current visible-light image and the three-dimensional environment model, the current pose of the host device from which the at least one current visible-light image is captured, wherein the current pose of the host device is in the global coordinate space;

for a given pixel of the at least one reconstructed image, determining based on the current pose of the host device whether or not a corresponding pixel exists in the at least one current visible-light image whose position in the global coordinate space matches with the position of the given pixel of the at least one reconstructed image;

replacing initial pixel values of the given pixel in the at least one reconstructed image with pixel values of the corresponding pixel in the at least one current visible-light image, when the corresponding pixel exists in the at least one current visible-light image; and sending the at least one reconstructed image to the client device for display thereat.

The present disclosure provides the aforementioned system and the aforementioned method for improving the quality of reconstructed images by using camera feed. Herein, the initial pixel values of the given pixel of the at least one reconstructed image (that is generated using the 3D environment model) are replaced with the pixel values of the corresponding pixel of the at least one current visible-light image, to enable in achieving a same (high) visual quality in both the at least one reconstructed image and the at least one current visible-light image, for the pixel(s) that is/are common in both the aforesaid images. Beneficially, in such a case, when a given pose of the client device has at least a partially overlapping perspective with that of the host device, a visual quality with which a user of the client device perceives visual content of the real-world environment (in the at least one reconstructed image) would be the same as a visual quality with which a user of the host device perceives the visual content. This facilitates in considerably enhancing an overall visual quality in the at least one reconstructed image, and enables in providing realism and immersiveness to the user of the client device when he/she views the at least one reconstructed image. Moreover, when the client device and the host device are located in different real-world environments, as long as the client device and the host device have overlapping perspectives (namely, overlapping fields of view) in the global coordinate space, the at least one reconstructed image will include high-quality portion(s) therein even if the 3D environment model is limited in terms of representing visual details of the real-world environment corresponding to those portion(s). This enables in realistic virtual teleportation from another real-world environment in which the client device is present to the real-world environment in which the host device is present. The method is fast, effective, reliable and can be implemented with ease.

The system comprises specialized equipment for generating the at least one reconstructed image by utilizing the three-dimensional (3D) environment model, processing the at least one reconstructed image, and then subsequently sending the at least one reconstructed image to the client device for display thereat. It will be appreciated that the system generates, processes, and sends the at least one reconstructed image in real time or near-real time.

Notably, the at least one server controls an overall operation of the system. The at least one server is communicably coupled to the host device and the client device. In an embodiment, the at least one server is implemented as a remote server. In such a case, the at least one server is separately located from both the host device and the client device. In such an instance, the at least one server is implemented as a processor of a computing device. Examples of the computing device include, but are not limited to, a laptop computer, a desktop computer, a tablet computer, a phablet, a personal digital assistant, a workstation, a console. In another embodiment, the at least one server is implemented as a part of the host device. In yet another embodiment, the at least one server is implemented as a part of the client device.

It will be appreciated that the term "at least one serve?" refers to "a single serve?" in some implementations, and to "a plurality of servers" in other implementations. When the system comprises the single server, all operations of the system are performed by the single server. When the system comprises the plurality of servers, different operations of the system are performed by different (specially configured) servers from amongst the plurality of servers. As an example, a first server from amongst the plurality of servers may be configured to process the plurality of visible-light images to generate the 3D environment model, and a second server from amongst the plurality of servers may be configured to utilise the 3D environment model to generate the at least one reconstructed image and the at least one reconstructed depth map.

Optionally, the host device is a first display device, whereas the client device is a second display device. In an embodiment, the host device is associated with a first user, whereas the client device is associated with a second user. In another embodiment, the host device is arranged on a remote device (such as a drone, a robot, a vehicle, or similar), whereas the client device is associated with a second user. In yet another embodiment, the host device is arranged at a given location within the real-world environment. In this regard, the host device is arranged on a support structure and is capable of a 3D rotation (and additionally, capable of a translation motion). Herein, the support structure can be moved to any required location in the real-world environment.

In some implementations, the host device and the client device are remotely located with respect to each other. Optionally, the host device and the client device are located in different real-world environments, wherein the host device is located in a first real-world environment and the client device is located in a second real-world environment. In other implementations, the host device and the client device are located in vicinity of each other. Optionally, the host device and the client device both are located in a same real-world environment, at a distance from each other. In such a case, the first real-world environment is the same as the second real-world environment.

The term "display device" refers to a specialized equipment that is capable of at least displaying images. These images are to be presented to a given user of a given display device. Optionally, the given display device is implemented as a head-mounted display (HMD) device. The term "head-mounted display" refers to specialized equipment that is configured to present an XR environment to a given user when said HMD device, in operation, is worn by the given user on his/her head. The HMD device is implemented, for example, as an XR headset, a pair of XR glasses, and the like, that is operable to display a visual scene of the XR environment to the given user. The term "extended-reality" encompasses virtual reality (VR), augmented reality (AR), mixed reality (MR), and the like.

The term "pose" encompasses both position and orientation. When the plurality of visible-light images are captured from different poses of the host device, the plurality of visible-light images represent visual content of the first real-world environment as captured from different perspectives of the at least one visible-light camera of the host device. A given perspective of the at least one visible-light camera changes when the host device moves around the first real-world environment, or when the host device is stationary and only an orientation of the at least one visible-light camera changes.

Throughout the present disclosure, the term "visible-light camera" refers to an equipment that is operable to detect and process visible-light signals received from the first real-world environment, so as to capture the plurality of visible-light images of the first real-world environment. Examples of the at least one visible-light camera include, but are not limited to, a Red-Green-Blue (RGB) camera, a Red-Green-Blue-Alpha (RGB-A) camera, and a monochrome camera.

Throughout the present disclosure, the term "three-dimensional environment model" refers to a data structure that comprises comprehensive information pertaining to a 3D space of the first real-world environment. Such a comprehensive information is indicative of a plurality of features of real objects present in the first real-world environment, shapes and sizes of the real objects or their portions, poses of the real objects or their portions, materials of the real objects or their portions, colours of the real objects or their portions, light sources and lighting conditions within the first real-world environment, and the like. The term "real object" encompasses a physical object, a part of the physical object, as well as a shadow casted by the physical object or its part. The real object could be a living object (for example, such as a human, a pet, a tree, and the like) or a non-living object (for example, such as the sky, a building, a road, a toy, a poster, a letter box, and the like). Optionally, the 3D environment model is in a form of at least one of: a 3D polygonal mesh, a 3D point cloud, a 3D surface cloud, a voxel-based model, a parametric model, a 3D grid, a 3D hierarchical grid, a bounding volume hierarchy. The 3D polygonal mesh could be a 3D triangular mesh, a 3D quadrilateral mesh, or similar.

Optionally, the at least one server is configured to store the 3D environment model at a data repository, wherein the data repository is communicably coupled to the at least one server. The data repository may be implemented as a memory of the at least one server, a cloud-based database, a memory of the host device, a memory of the client device, or similar.

Optionally, when processing the plurality of visible-light images to generate the 3D environment model of the first real-world environment, the at least one server is configured to employ at least one data processing algorithm. Optionally, in this regard, the at least one data processing algorithm is at least one of: a feature extraction algorithm, an image stitching algorithm, an image merging algorithm, an interpolation algorithm, a 3D modelling algorithm, a photogrammetry algorithm, an image layering algorithm, an image blending algorithm. Such data processing algorithms are well-known in the art. Examples of the plurality of features include, but are not limited to, edges, corners, blobs and ridges. Examples of the feature extraction algorithm include, but are not limited to: an edge-detection algorithm (for example, such as Canny edge detector, Deriche edge detector, and the like), a corner-detection algorithm (for example, such as Harris & Stephens corner detector, Shi-Tomasi corner detector, Features from Accelerated Segment Test (FAST) corner detector, and the like), a blob-detection algorithm (for example, such as Laplacian of Gaussian (LoG)-based blob detector, Difference of Gaussians (DoG)-based blob detector, Maximally Stable Extremal Regions (MSER) blob detector, and the like), a feature descriptor algorithm (for example, such as Binary Robust Independent Elementary Features (BRIEF), Gradient Location and Orientation Histogram (GLOH), Histogram of Oriented Gradients (HOG), and the like), and a feature detector algorithm (for example, such as Scale-Invariant Feature Transform (SIFT), Oriented FAST and rotated BRIEF (ORB), Speeded Up Robust Features (SURF), and the like).

Throughout the present disclosure, the term "global coordinate space" refers to a 3D space of the first real-world environment that is represented by a global coordinate system. The global coordinate system defines a position within the 3D space of the first real-world environment. Optionally, the global coordinate system has a predefined origin and three mutually perpendicular coordinate axes. The mutually perpendicular three coordinate axes could be, for example, X, Y, and Z axes. Optionally, in this regard, the position in the global coordinate system is expressed as (x, y, z) position coordinates along the X, Y and Z axes, respectively.

Optionally, the at least one server is further configured to:

receive, from the host device, information indicative of corresponding poses of the host device from which the plurality of visible-light images are captured, wherein the corresponding poses of the host device are provided in the global coordinate space; and process the plurality of visible-light images to generate the three-dimensional environment model of the real-world environment, based on the corresponding poses of the host device.

Optionally, in this regard, the information indicative of corresponding poses of the host device is generated by a first pose-tracking means of the host device, or by a first pose-tracking means communicably coupled to the host device. Moreover, optionally, the corresponding poses of the host device are (directly) obtained from the first pose-tracking means. A given pose-tracking means is a specialized equipment that is employed to detect and/or follow poses of a given device in a 3D space of a given real-world environment. The term "given device" encompasses the host device, or the client device, or both these devices. Pursuant to embodiments of the present disclosure, the given pose-tracking means is implemented as a true six Degrees of Freedom (6DoF) tracking system. In other words, the given pose-tracking means performs pose tracking within the 3D space of the given real-world environment. In particular, said pose-tracking means is configured to track translational movements (namely, surge, heave and sway movements) and rotational movements (namely, roll, pitch and yaw movements) of the given device within the 3D space.

The given pose-tracking means could be implemented as an internal component of the given device, as a tracking system external to the given device, or as a combination thereof. The given pose-tracking means could be implemented as at least one of: an optics-based tracking system (which utilizes, for example, infrared (IR) beacons and detectors, IR cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. As an example, a detectable object may be an active IR Light-Emitting Diode (LED), a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader. Optionally, the given pose-tracking means is implemented as at least one processor that is configured to determine a given pose of the given device using a Simultaneous Localization and Mapping (SLAM) technique.

Optionally, the at least one server is configured to process the information indicative of the given pose of the given device for determining the given pose of the given device in the global coordinate space, wherein the information indicative of the given pose of the given device comprises pose-tracking data of the given device. Optionally, the at least one server employs at least one data processing algorithm to process the pose-tracking data of the given device. The pose-tracking data may be in form of images, IMU/TIMU values, motion sensor data values, magnetic field strength values, or similar. Correspondingly, requisite data processing algorithm(s) is/are employed to process the pose-tracking data, to determine the given pose of the given device in the global coordinate space. Examples of such at least one data processing algorithm include a feature detection algorithm, an environment mapping algorithm, a pose data extrapolation algorithm, and the like. Moreover, the pose-tracking means employs either an outside-in tracking technique or an inside-out tracking technique for collecting the pose-tracking data.

Optionally, when the plurality of visible-light images are processed based on the corresponding poses of the host device, the plurality of visible-light images are associated with the corresponding poses of the host device to enable the at least one server for accurately determining the real objects or their portions that are visible in the plurality of visible-light images from various perspectives of the corresponding poses of the host device. Such a determination is well-utilized by the at least one server when generating the comprehensive information constituting the 3D environment model. Beneficially, the 3D environment model generated in such a manner is highly accurate (in terms of reconstructing the first real-world environment), realistic, and is information-rich.

Optionally, the at least one server is further configured to:
receive, from the host device, at least one of: a plurality of depth maps of the real-world environment, a set of phase images captured by at least one depth sensor of the host device with respect to corresponding poses of the host device from which the plurality of visible-light images are captured; and process the plurality of visible-light images to generate the three-dimensional environment model of the real-world environment, based on the at least one of: the plurality of depth maps, the set of phase images.

The term "depth map" refers to a data structure comprising information pertaining to optical depths of the real objects or their portions present in the first real-world environment. When the at least one server receives the plurality of depth maps from the host device, said optical depths are readily available to the at least one server. A given depth map provides information pertaining to distances (namely, the optical depths) of surfaces of the real objects from a given pose (namely, a viewpoint or a viewing direction) of the host device. Optionally, the given depth map is in a form of a given depth image of the first real-world environment that is captured by the at least one depth sensor of the host device. Optionally, in this regard, the processor of the host device is configured to control the at least one depth sensor to capture the given depth image of the first real-world environment. The term "depth sensor" refers to a sensor that is operable to at least detect optical depths in the first real-world environment so as to capture the given depth image of the first real-world environment. The given depth image represents the optical depths of the real objects present in the first real-world environment. The given depth image may also represent the visual content of the first real-world environment, in addition to the optical depths of the real objects. Optionally, the given depth image is a two-dimensional (2D) depth image or a 3D depth image. The at least one depth sensor may be implemented as a light-based depth sensor, a sound-based depth sensor, or similar. It will be appreciated that the given depth image of the first real-world environment is captured from a certain pose of the at least one depth sensor that corresponds to the pose of the host device from which a corresponding visible-light image is captured.

Optionally, the at least one depth sensor is a part of at least one depth camera. The at least one depth camera is arranged on the host device. Examples of at least one depth camera include, but are not limited to, a Red-Green-Blue-Depth (RGB-D) camera, a stereo camera, a Time-of-Flight (ToF) camera, an IR camera, a ranging camera, a Light Detection and Ranging (LiDAR) camera, a flash LiDAR camera, a Sound Navigation and Ranging (SONAR) camera, a laser rangefinder, a plenoptic camera. It will be appreciated that when the at least one depth camera is the RGB-D camera, the given depth map could be in form of depth values of each pixel in a given RGB-D image, wherein the depth values are provided via a depth channel that is present along with a red colour channel, a green colour channel, and a blue colour channel for each pixel.

Optionally, the phase image is captured using the at least one depth sensor of the host device by: illuminating the first real-world environment with a modulated light signal, and then detecting and processing a reflection of the modulated light signal that is received from the first real-world environment, for determining a specific phase shift between said illumination and said reflection. The "phase image" is representative of such a phase shift. Information indicative of this phase shift constitutes the phase image and is obtained by sampling a cross-correlation of the modulated light signal with the reflection of the modulated light signal. Optionally, the processor of the host device is configured to control the at least one depth sensor for capturing the set of phase images with respect to the corresponding poses of the host device from which the plurality of visible-light images are captured. Since the set of phase images does not directly indicate the optical depths of the real objects or their portions present in the first real-world environment, the at least one server is optionally configured to process the set of phase images to generate the plurality of depth maps of the first real-world environment. This is because when the at least one server receives only the set of phase images from the host device, the optical depths would not be readily available to the at least one server. In an example implementation, the set of phase images comprises at least four different phase images, which may be processed by the at least one server for generating a given depth map.

Optionally, the plurality of visible-light images are processed based on the at least one of: the plurality of depth maps, the set of phase images, to enable the at least one server to utilize the optical depths of the real objects when generating the 3D environment model. In such a case, the 3D environment model is accurately and comprehensively generated. This is because information pertaining to the visual content as well as the optical depths in the first real-world environment is accurately known, to the at least one server, in great detail from various perspectives of the host device. Thus, the 3D environment model would further include information pertaining to placements, geometries, occlusions, and the like, of the real objects from the various perspectives of the host device. Beneficially, the 3D environment model generated in such a manner is highly accurate (in terms of reconstructing the first real-world environment), realistic, and is information-rich.

Optionally, the information indicative of the given pose of the client device is generated by a second pose-tracking means of the client device, or by a second pose-tracking means communicably coupled to the client device. Moreover, optionally, in this regard, the given pose of the client device is (directly) obtained from the second pose-tracking means. In an embodiment, the second pose-tracking means captures pose-tracking data of the client device in the global coordinate space. In another embodiment, the second pose-tracking means captures pose-tracking data of the client device in a local coordinate space and then the second pose-tracking means or the at least one server uses a transformation function to convert the captured pose-tracking data in the local coordinate space to the pose-tracking data in the global coordinate space. Optionally, the transformation function comprises a position transformation function and/or an orientation transformation function.

Notably, the at least one reconstructed image and the at least one reconstructed depth map are generated according to a viewpoint and/or a viewing direction of the client device. The at least one reconstructed image represents the visual content of the first real-world environment (where the host device is present) from the perspective of the given pose of the client device in the global coordinate space, said visual content being generated using the 3D environment model. The at least one reconstructed depth map represents the optical depths of the real objects or their portions present in the first real-world environment from the perspective of the given pose of the client device in the global coordinate space, said optical depths being determined using the 3D environment model. Optionally, the at least one reconstructed depth map is in a form of a reconstructed depth image.

Optionally, when utilising the 3D environment model to generate the at least one reconstructed image and the at least one reconstructed depth map, the at least one server is configured to employ at least one data processing algorithm. Optionally, in this regard, the at least one data processing algorithm enables in transforming a 3D point in the 3D environment model to a 2D point in the at least one reconstructed image, from the perspective of the given pose of the client device. Optionally, the at least one data processing algorithm is at least one of: an image synthesis algorithm (such as an RGB-D image synthesis algorithm), a view synthesis algorithm, a rendering algorithm. In an example, when the 3D environment model is in the form of a 3D polygonal mesh, for example, such as a 3D triangular mesh, the image synthesis algorithm may be a triangle rasterization algorithm. In another example, when the 3D environment model is in the form of a voxel-based model (such as a Truncated Signed Distance Field (TSDF) model), the image synthesis algorithm may be a ray marching algorithm. In yet another example, when the 3D environment model is in the form of a 3D point cloud, the rendering algorithm may be a point cloud rendering algorithm, a point cloud splatting algorithm, an elliptical weighted-average surface splatting algorithm, and the like.

It will be appreciated that each pixel of the at least one reconstructed image corresponds to a 3D real-world point or a 3D real-world region of the first real-world environment. In this regard, the at least one server is configured to utilize the given pose of the client device (from a perspective with which the real objects are visible in the at least one reconstructed image) and the at least one reconstructed depth map (which represents the optical depths of the real objects in the at least one reconstructed image from the perspective of the given pose of the client device), to ascertain the position of each pixel of the least one reconstructed image in the global coordinate space. Such a position is a real-world position of the 3D real-world point or the 3D real-world region. Optionally, in this regard, the at least one server is configured to employ at least one mathematical technique and/or at least one inverse projection transformation technique to determine the position of each pixel of the at least one reconstructed image in the global coordinate space. The at least one mathematical technique could be based on linear transformations. Optionally, the at least one inverse projection transformation technique utilizes an inverse projection matrix to determine a relative position of the 3D real-world point or the 3D real-world region from the perspective of the client device, wherein the inverse projection matrix is an inverse of a projection matrix of a given camera that is used to generate a given visible-light image. Based on the given pose of the client device that is known in the global coordinate space, the relative position of the 3D real-world point or the 3D real-world region is then transformed into the real-world position of the 3D real-world point or the 3D real-world region in the global coordinate space. It will be appreciated that the position of each pixel determined in such a manner would be accurate and precise.

Notably, the at least one server receives the at least one current visible-light image of the first real-world environment from the host device, wherein the current visible-light image represents a current (namely, a latest or a present) visual content of the first real-world environment. In some implementations, the at least one visible-light camera is employed both for capturing the current visible-light image and the plurality of visible-light images. In such implementations, the host device may not comprise the at least one other visible-light camera. In other implementations, the at least one other visible-light camera is employed for capturing the current visible-light image, whereas the at least one visible-light camera is employed for capturing the plurality of visible-light images. In such implementations, the at least one other visible-light camera is not employed for capturing the plurality of visible-light images using which the 3D environment model is generated. As an example, the at least one other visible-light camera may comprise three visible-light cameras A1, A2, and A3, for capturing the current visible-light image, while the at least one visible-light camera may comprise two visible-light cameras B1 and B2, for capturing the plurality of visible-light images.

The "current pose" of the host device refers to a latest or a present pose of the host device from which the at least one current visible-light image is captured. In some implementations, the at least one server is configured to receive the information indicative of the current pose of the host device from the host device. In other implementations, the at least one server is configured to determine the current pose of the host device by: obtaining at least one current depth map of the first real-world environment; and matching the at least one current depth map with the 3D environment model. Optionally, the at least one current depth map is generated, by the at least one server, using at least two current visible-light images. Since the at least two current visible-light images are captured by the at least one visible-light camera, the current pose of the host device thus determined, is accurate. Alternatively, optionally, the at least one current depth map is generated by the host device, and the at least one server is configured to directly receive the at least one current depth map from the host device. The at least one current depth map is indicative of current optical depths of the real objects or their portions present in the first real-world environment. Optionally, when matching the at least one current depth map with the 3D environment model, the at least one server is configured to employ at least one of: an iterative closest point technique, a point set registration technique, a robust point matching technique, a kernel correlation technique, a coherent point drift technique, to determine the current pose of the host device. As an example, a given depth map may be considered as a point cloud from the perspective of a given camera. In a case where the 3D environment model is a point cloud (or can be transformed into a point cloud), a point set registration technique could be employed to determine an iterative closest point for each point of the given depth map. It will be appreciated that any suitable alternative technique may be employed to determine the current pose of the host device, for example, based on at least one of: the at least two current visible-light images, current depth images. Beneficially, the current pose of the host device determined (by the at least one server) in such a manner may be more accurate than the information indicative of the current pose of the host device (that is received from the host device).

In an embodiment, the at least one server is further configured to:

receive, from the host device, at least one of: at least one current depth map of the real-world environment, at least one current phase image captured by at least one depth sensor of the host device with respect to the current pose of the host device from which the at least one current visible-light image is captured; and determine a position of each pixel of the at least one current visible-light image in the global coordinate space, based on the current pose of the host device and the at least one of: the at least one current depth map, the at least one current phase image.

Optionally, the at least one server is configured to process at least two current phase images for generating the at least one current depth map of the first real-world environment. In this regard, the at least one server is configured to employ at least one image processing algorithm for processing the at least two current phase images. Since the at least one current visible-light image represents a current visual content of the first real-world environment (i.e., indicating a current state of the first real-world environment), each pixel of the at least one current visible-light image corresponds to a 3D real-world point or a 3D real-world region of the first real-world environment. Thus, the position of each pixel of the at least one current visible-light image corresponds to a current position of the 3D real-world point or the 3D real-world region. In this regard, the at least one server is configured to utilize the perspective of the current pose of the host device (with which the real objects are currently visible in the at least one current visible-light image) and current depth information (of the at least one current depth map and/or the at least one current phase image), to ascertain the position of each pixel of the least one current visible-light image in the global coordinate space. The current depth information comprises current optical depths of the real objects in the at least one current visible-light image from the perspective of the current pose of the host device.

In another embodiment, the at least one server is further configured to:

utilise the three-dimensional environment model to generate at least one current depth map from a perspective of the current pose of the host device; and determine, based on the at least one current depth map and the current pose of the host device, a position of each pixel of the at least one current visible-light image in the global coordinate space.

The 3D environment model is beneficially utilised to generate the at least one current depth map from the perspective of the current pose of the host device in a similar manner as the 3D environment model is utilised to generate the at least one reconstructed depth map from the perspective of the given pose of the client device.

In yet another embodiment, the at least one visible-light camera comprises at least two visible-light cameras, and the at least one current visible-light image comprises at least two current visible-light images, wherein the at least one server is further configured to:

process the at least two current visible-light images to generate at least one current depth map from a perspective of the current pose of the host device; and determine a position of each pixel of the at least one current visible-light image in the global coordinate space, based on the at least one current depth map and the current pose of the host device.

Optionally, when processing the at least two current visible-light images to generate the at least one current depth map, pixels of the at least two current visible-light images that represent a same 3D point or a same 3D region in the first real-world environment are matched. Then, binocular disparities between the matched pixels of the at least two current visible-light images are determined. These binocular disparities are processed (for example, using a triangulation technique) to determine the optical depths of the real objects with respect to the at least two visible-light cameras. Such optical depths of the real objects within the first real-world environment are represented in the at least one current depth map. The at least one server is configured to utilize the perspective of the current pose of the host device with which the real objects are presently visible in the at least two current visible-light images, and utilise depth information of the at least one current depth map, to ascertain the position of each pixel of the least one current visible-light image in the global coordinate space.

Optionally, the at least one server is configured to employ the at least one mathematical technique for determining the position of each pixel of the at least one current visible-light image in the global coordinate space. It will be appreciated that the first real-world environment may be dynamic, and thus may include movable real objects, state-changing real objects, or similar. In such a case, positions of the real objects in the first real-world environment may have changed over time (from capturing the plurality of visible-light images to capturing of the at least one current visible-light image). Therefore, the determination of the position of each pixel of the at least one current visible-light image in the global coordinate space is performed according to any of the aforesaid alternative embodiments to subsequently facilitate realistic and accurate virtual teleportation from the second real-world environment of the client device to the first real-world environment of the host device. Moreover, the 3D environment model is also updated based on the current visible-light image(s).

Notably, the position of each pixel of the at least one current visible-light image in the global coordinate space is subsequently utilized in determining, for the given pixel of the at least one reconstructed image, whether or not the corresponding pixel exists in the at least one current visible-light image whose position in the global coordinate space matches with the position of the given pixel of the at least one reconstructed image. Optionally, in this regard, the at least one server is configured to compare the position of each pixel of the at least one reconstructed image in the global coordinate space with the position of each pixel of the at least one current visible-light image in the global coordinate space. It will be appreciated that such a comparison is performed in order to determine pixels that represent a same 3D real-world point or a same 3D real-world region of the first real-world environment in the at least one reconstructed image and the at least one current visible-light image. The pixel(s) whose position(s) in the global coordinate space is/are same for both the aforesaid images, will represent the same 3D real-world point or the same 3D real-world region. Therefore, the aforesaid determination is made to check whether the first user of the host device and the second user of the client device are observing the same 3D real-world point or the same 3D real-world region of the first real-world environment. It will be appreciated that when the first user and the second user are observing the same 3D real-world point or the same 3D real-world region, said 3D real-world point or said 3D real-world region need not lie at same position within perspectives of the host device and the client device. For example, when both the first user and the second user are observing a table of the first real-world environment, the table may lie at a centre of the perspective of the host device, but may lie at a right-side portion of the perspective of the client device.

Optionally, the at least one server is further configured to determine, for the given pixel of the at least one reconstructed image, whether or not a corresponding pixel exists in the at least one current visible-light image whose position in the global coordinate space matches with the position of the given pixel of the at least one reconstructed image, further based on at least one of: an extent of a field of view captured by the at least one visible-light camera or the at least one other visible-light camera, a mapping of a three-dimensional point in the three-dimensional environment model to a two-dimensional point in the at least one current visible-light image.

Optionally, in this regard, the extent of the field of view captured by the at least one visible-light camera or the at least one other visible-light camera changes according to a change in projection settings (such as a zoom level, a distortion level, or similar) of the at least one visible-light camera or the at least one other visible-light camera. The projection settings of a given camera are indicative of optical properties of the given camera. Optionally, the projection settings of the at least one visible-light camera or the at least one other visible-light camera are utilised to determine: the extent of the field of view captured by the at least one visible-light camera or the at least one other visible-light camera; and the mapping of the 3D point in the 3D environment model to the 2D point in the at least one current visible-light image. The extent of the field of view captured by the at least one visible-light camera or the at least one other visible-light camera refers to an angular width of a region of the first real-world environment that is visible in the at least one current visible-light image, from a perspective of the current pose of the host device. Beneficially, the aforesaid determination of the corresponding pixel of the at least one current visible-light image for the given pixel of the at least one reconstructed image would be highly accurate.

Since the at least one reconstructed image is generated using the 3D environment model, 3D points in the 3D environment model represented in the at least one reconstructed image are readily known to the at least one server. Furthermore, the at least one server is optionally configured to determine which positions in the global coordinate space are represented by the pixels of the at least one current visible-light image using the mapping of the 3D point in the 3D environment model to the 2D point in the at least one current visible-light image. Thus, the position of each pixel of the at least one current visible-light image in the global coordinate space is well-known to the at least one server, and accordingly the at least one server can accurately determine the corresponding pixel in the at least one current visible-light image in the global coordinate space whose position matches with the position of the given pixel of the at least one reconstructed image.

The term "pixel value" refers to an intensity value of a given pixel of a given image which encompasses not only a colour value (namely, intensity) of the given pixel, but also a luminance value, a transparency value, an illumination value (namely, brightness), or similar, of the given pixel. Optionally, the colour value of the given pixel is an RGB colour value, a high dynamic range (HDR) colour value, or an RGB-A colour value. Herein the term "given image" encompasses the at least one reconstructed image and/or the at least one current visible-light image.

Since the initial pixel values of the given pixel in the at least one reconstructed image are derived (namely, determined) using the 3D environment model (when the at least one reconstructed image is generated), these initial pixel values may be relatively less accurate as compared to the (current or present) pixel values of the corresponding pixel in the at least one current visible-light image. This is because the first real-world environment may have changed over time from between generation of the 3D environment model and capturing of the at least one current visible-light image. Therefore, the initial pixel values of the given pixel are replaced with the pixel values of the corresponding pixel. As a result, this enables in achieving a same (high) visual quality in both the at least one reconstructed image and the at least one current visible-light image, for the pixel(s) that is/are common in both the at least one reconstructed image and the at least one current visible-light image. In other words, a visual quality with which the second user (of the client device) perceives the visual content of the first real-world environment (in the at least one reconstructed image), would be same as a visual quality with which the first user (of the host device) perceives the visual content of the first real-world environment, when a pose of the client device has at least a partially overlapping perspective with that of the host device. Beneficially, this facilitates in considerably enhancing an overall visual quality in the at least one reconstructed image, and enables in providing realism and immersiveness to the second user of the client device when the second user views the at least one reconstructed image. When the client device is not present in the same real-world environment as that of the host device (i.e., when the client device is located in the second real-world environment and the host device is located in the first real-world environment), as long as the client device and the host device have overlapping perspectives in the global coordinate space, the at least one reconstructed image will include high-quality portion(s) therein. This enables in realistic virtual teleportation from the second real-world environment of the client device to the first real-world environment of the host device.

In an example, the plurality of visible-light images (used to generate the 3D environment model) may comprise a visible-light image that represents a lamp in an off state present in the first real-world environment. Herein, when the at least one reconstructed image is generated using the 3D model, initial pixel values of pixels in the at least one reconstructed image corresponding to the lamp in the off state may be '710' and such pixels would have a 'beige' colour. Further, the at least one current visible-light image may represent the same lamp in an on state present in the first real-world environment. Pixel values of pixels in the at least one current visible-light image corresponding to the lamp in the on state may be '510' and such pixels would have a 'yellow' colour. In such a case, the initial pixel values of the pixels in the at least one reconstructed image are replaced with the pixel values of the pixels in the at least one current visible-light image.

Optionally, the at least one server is further configured to leave the initial pixel values of the given pixel in the at least one reconstructed image unchanged, when no corresponding pixel exists in the at least one current visible-light image. In this regard, a given pose of the client device has no overlapping perspective with that of the host device. In such a case, the at least one reconstructed image has same visual quality as that of the 3D environment model. Beneficially, this enables in saving processing resources and reducing processing time of the at least one server, and thus facilitates in communicating the at least one reconstructed image to the client device, in real time or near-real time (i.e., without any latency).

Notably, the at least one reconstructed image is sent (i.e., communicated) from the at least one server to the client device, wherein said communication occurs in real time or near-real time (i.e., without any latency). Optionally, the at least one reconstructed image is displayed via a light source of the client device. Herein, the term "light source" refers to an element from which light emanates. Optionally, the light source is implemented as a display. In this regard, the at least one reconstructed image is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, the light source is implemented as a projector. In this regard, the at least one reconstructed image is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector. Optionally, the light source is a single-resolution light source or a multi-resolution light source.

Optionally, the at least one server is further configured to:
modify the three-dimensional environment model to represent an extended-reality environment, by including at least one virtual segment representing at least one virtual object in the three-dimensional environment model, prior to utilising the three-dimensional environment model to generate the at least one reconstructed image and the at least one reconstructed depth map;
determine whether or not at least a part of the at least one virtual object is visible in the at least one reconstructed image;
when at least the part of the at least one virtual object is visible in the at least one reconstructed image, identify pixels representing at least the part of the at least one virtual object in the at least one reconstructed image; and
skip an operation of replacing initial pixel values of the identified pixels in the at least one reconstructed image with pixel values of corresponding pixels in the at least one current visible-light image.

In this regard, the at least one reconstructed image is an XR image that represents both the real object and the at least one virtual object. In the XR environment, the at least one virtual segment representing the at least one virtual object is digitally superimposed over a segment of the 3D environment model. It will be appreciated that the XR environment is represented in a same global coordinate space as that of the 3D environment model. Herein, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information.

It will be appreciated that the inclusion of the at least one virtual segment representing the at least one virtual object in the 3D environment model encompasses at least one of: an addition of the at least one virtual segment in the 3D environment model, a replacement of an existing segment of the 3D environment model with the at least one virtual segment. Optionally, a shape and a size of the at least one virtual segment is determined according to a shape and a size of the at least one virtual object. Moreover, a location of the at least one virtual segment in the 3D environment model corresponds to a required location of the at least one virtual object in the 3D environment model. The required location of the of the at least one virtual object may be pre-known to the at least one server.

Upon modifying the 3D environment model to represent the XR environment prior to utilising the 3D environment model, the at least one reconstructed depth map that is subsequently generated may represent an optical depth of at least the part of the at least one virtual object, in addition to the optical depths of the real objects or their portions present in the first real-world environment. Such a reconstructed depth map enables in providing depth information for the XR environment in the global coordinate space.

Optionally, the at least one server is configured to determine whether or not at least the part of the at least one virtual object is visible in the at least one reconstructed image, based at least on the given pose of the client device. In one case, at least the part of the at least one virtual object lies within a perspective of the given pose of the client device, without being occluded by other virtual object(s) or real object(s). In such a case, at least the part of the at least one virtual object is visible in the at least one reconstructed image. In another case, at least the part of the at least one virtual object lies within a perspective of the given pose of the client device, but is occluded by other virtual object(s) or real object(s). In such a case, at least the part of the at least one virtual object is not visible in the at least one reconstructed image. In yet another case, when at least the part of the at least one virtual object does not lie within a perspective of the given pose of the client device, at least the part of the at least one virtual object is not visible in the at least one reconstructed image. Optionally, when at least the part of the at least one virtual object is visible in the at least one reconstructed image, the at least one server is configured to determine positions of the pixels representing at least the part of the at least one virtual object, in the global coordinate space, for identifying the pixels representing at least the part of the at least one virtual object in the at least one reconstructed image. Since the at least one virtual object is generated and is included in the 3D environment model by the at least one server, the positions of said pixels are already known and accurately known to the at least one server.

Optionally, the at least one server is configured to apply a pixel mask on the identified pixels representing at least the part of the at least one virtual object, to obscure the identified pixels from replacement of the initial pixel values of the identified pixels with the pixel values of the corresponding pixels. It will be appreciated that the operation of replacing the initial pixel values of the identified pixels with the pixel values of the corresponding pixels is skipped because all pixel values of the pixels representing the at least one virtual object in the at least one reconstructed image are accurate. These values are provided by the at least one server when modifying the 3D environment model to represent the XR environment, and therefore are accurate and do not need any modification. Beneficially, this enables in saving processing resources and reducing processing time of the at least one server, and thus facilitates in communicating the at least one reconstructed image to the client device, in real time or near-real time (i.e., without any latency).

The present disclosure also relates to the method as described above. Various embodiments and variants disclosed above, with respect to the aforementioned first aspect, apply mutatis mutandis to the method.

Optionally, the method further comprises:
receiving, from the host device, information indicative of corresponding poses of the host device from which the plurality of visible-light images are captured, wherein the corresponding poses of the host device are provided in the global coordinate space; and
processing the plurality of visible-light images to generate the three-dimensional environment model of the real-world environment, based on the corresponding poses of the host device.

Optionally, the method further comprises receiving, from the host device, at least one of: a plurality of depth maps of the real-world environment, a set of phase images captured by at least one depth sensor of the host device with respect to corresponding poses of the host device from which the plurality of visible-light images are captured,
wherein the step of processing the plurality of visible-light images to generate the three-dimensional environment model of the real-world environment is performed based on the at least one of: the plurality of depth maps, the set of phase images.

Optionally, the method further comprises:
receiving, from the host device, at least one of: at least one current depth map of the real-world environment, at least one current phase image captured by at least one depth sensor of the host device with respect to the current pose of the host device from which the at least one current visible-light image is captured; and
determining a position of each pixel of the at least one current visible-light image in the global coordinate space, based on the current pose of the host device and the at least one of: the at least one current depth map, the at least one current phase image.

Optionally, the method further comprises:
utilising the three-dimensional environment model to generate at least one depth map from a perspective of the current pose of the host device; and
determining, based on the at least one depth map and the current pose of the host device, a position of each pixel of the at least one current visible-light image in the global coordinate space.

Optionally, the at least one visible-light camera comprises at least two visible-light cameras, and the at least one current visible-light image comprises at least two current visible-light images, wherein the method further comprises:
processing the at least two current visible-light images to generate at least one depth map from a perspective of the current pose of the host device; and
determining a position of each pixel of the at least one current visible-light image in the global coordinate space, based on the at least one depth map and the current pose of the host device.

Optionally, in the method, the step of determining, for the given pixel of the at least one reconstructed image, whether or not a corresponding pixel exists in the at least one current visible-light image whose position in the global coordinate space matches with the position of the given pixel of the at least one reconstructed image is performed further based on at least one of: an extent of a field of view captured by the at least one visible-light camera or the at least one other visible-light camera, a mapping of a three-dimensional point in the three-dimensional environment model to a two-dimensional point in the at least one current visible-light image.

Optionally, the method further comprises leaving the initial pixel values of the given pixel in the at least one reconstructed image unchanged, when no corresponding pixel exists in the at least one current visible-light image.

Optionally, the method further comprises:
modifying the three-dimensional environment model to represent an extended-reality environment, by including at least one virtual segment representing at least one virtual object in the three-dimensional environment model, prior to utilising the three-dimensional environment model to generate the at least one reconstructed image and the at least one reconstructed depth map;
determining whether or not at least a part of the at least one virtual object is visible in the at least one reconstructed image;
when at least a part of the at least one virtual object is visible in the at least one reconstructed image, identifying pixels representing the at least a part of the at least one virtual object in the at least one reconstructed image; and
skipping an operation of replacing initial pixel values of the identified pixels in the at least one reconstructed image with pixel values of corresponding pixels in the at least one current visible-light image.

DETAILED DESCRIPTION OF THE DRAWINGS

Figure 1:
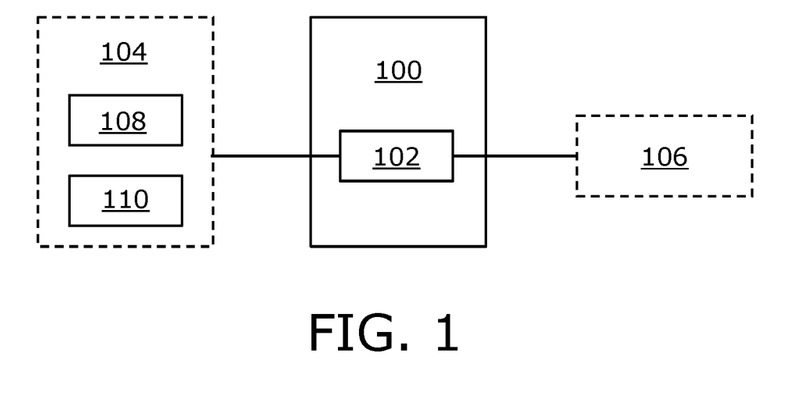
FIG. 1 illustrates a block diagram of an architecture of a system for improving quality of reconstructed images, in accordance with an embodiment of the present disclosure.

Referring to FIG. 1, illustrated is a block diagram of an architecture of a system 100, in accordance with an embodiment of the present disclosure. The system 100 comprises at least one server (depicted as a server 102). The server 102 is communicably coupled to a host device 104 and a client device 106. The host device 104 comprises at least one visible-light camera (depicted as a visible-light camera 108), and at least one other visible-light camera (depicted as one other visible-light camera 110).

Figure 2:
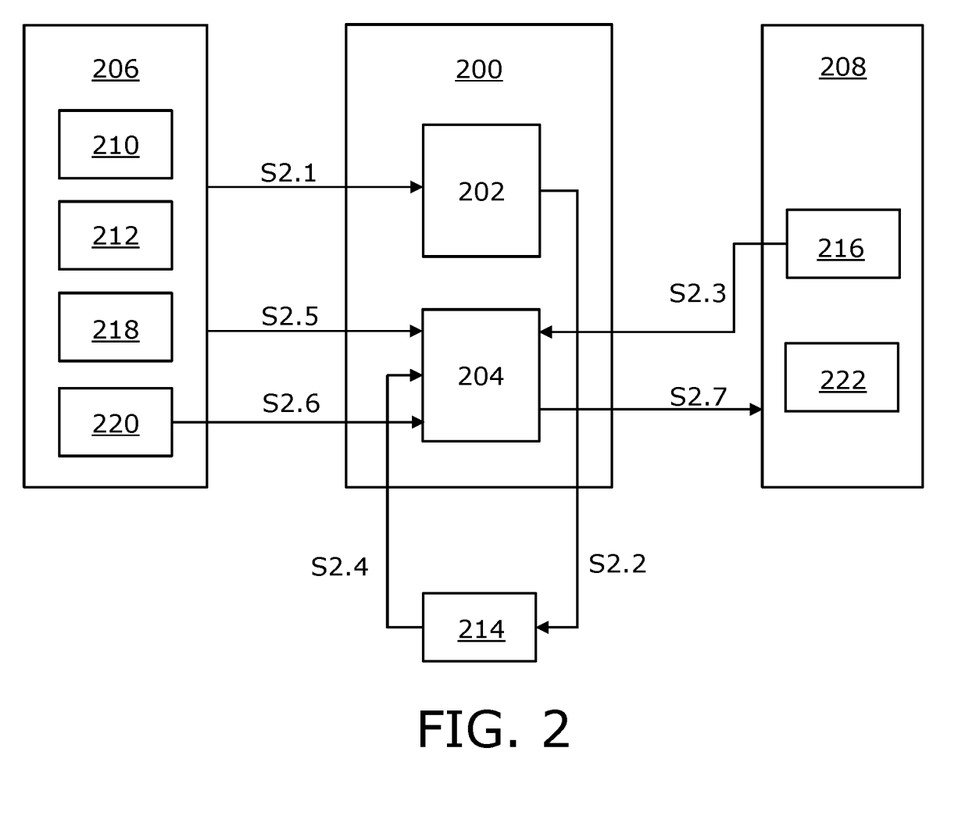
FIG. 2 is an exemplary process flow when a system for improving quality of reconstructed images is in use, in accordance with an embodiment of the present disclosure.

Referring to FIG. 2, illustrated is an exemplary process flow when a system 200 is in use, in accordance with an embodiment of the present disclosure. The system 200 comprises at least one server (depicted as two servers 202 and 204). The system 200 is communicably coupled to a host device 206 and a client device 208. At step S2.1, the host device 206 sends a plurality of visible-light images of a real-world environment captured by at least one visible-light camera (depicted as two visible-light cameras 210 and 212) of the host device 206, to the server 202. At step S2.2, the server 202 processes the plurality of visible-light images to generate a three-dimensional (3D) environment model 214 of the real-world environment, wherein the 3D environment model 214 is generated in a global coordinate space. At step S2.3, the client device 208 (or in particular, a pose-tracking means 216 of the client device 208) sends, to the server 204, information indicative of a given pose of the client device 208 in the global coordinate space. At step S2.4, the server 204 utilises the 3D environment model 214 to generate at least one reconstructed image and at least one reconstructed depth map from a perspective of the given pose of the client device 208. The server 204 determines a position of each pixel of the at least one reconstructed image in the global coordinate space, based on the at least one reconstructed depth map and the given pose of the client device 208. At step S2.5, the host device 206 sends at least one current visible-light image of the real-world environment to the server 204, wherein the at least one current visible-light image is captured by the two visible-light cameras 210 and 212 or at least one other visible-light camera (depicted as one other visible-light camera 218) of the host device 206. At step S2.6, the host device 206 (or in particular, a pose-tracking means 220 of the host device 206) sends, to the server 204, information indicative of a current pose of the host device 206 from which the at least one current visible-light image is captured, wherein the current pose of the host device 206 is in the global coordinate space. The server 204 determines whether or not a corresponding pixel exists in the at least one current visible-light image whose position in the global coordinate space matches with the position of the given pixel of the at least one reconstructed image, for a given pixel of the at least one reconstructed image, based on the current pose of the host device 206. The server 204 replaces initial pixel values of the given pixel in the at least one reconstructed image with pixel values of the corresponding pixel in the at least one current visible-light image, when the corresponding pixel exists in the at least one current visible-light image. At step S2.7, the server 204 sends the at least one reconstructed image to the client device 208 for display thereat. The at least one reconstructed image is displayed via a light source 222 of the client device 208. In an example, the server 204 and the server 206 may be implemented as a 3D re-constructor and a client renderer, respectively.

Figure 3A:
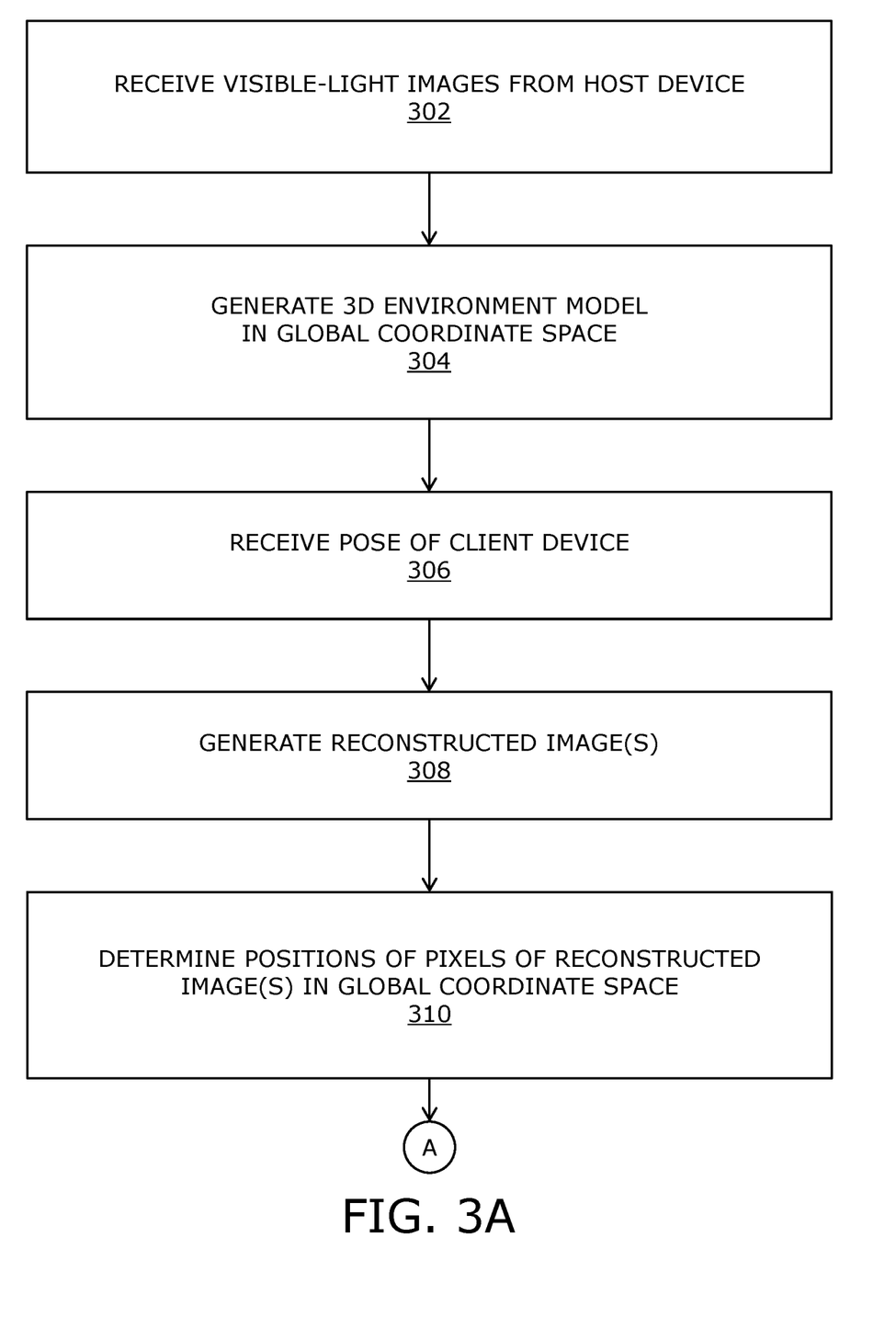
FIGS. 3A and 3B illustrate steps of a method for improving quality of reconstructed images, in accordance with an embodiment of the present disclosure.
Figure 3B:
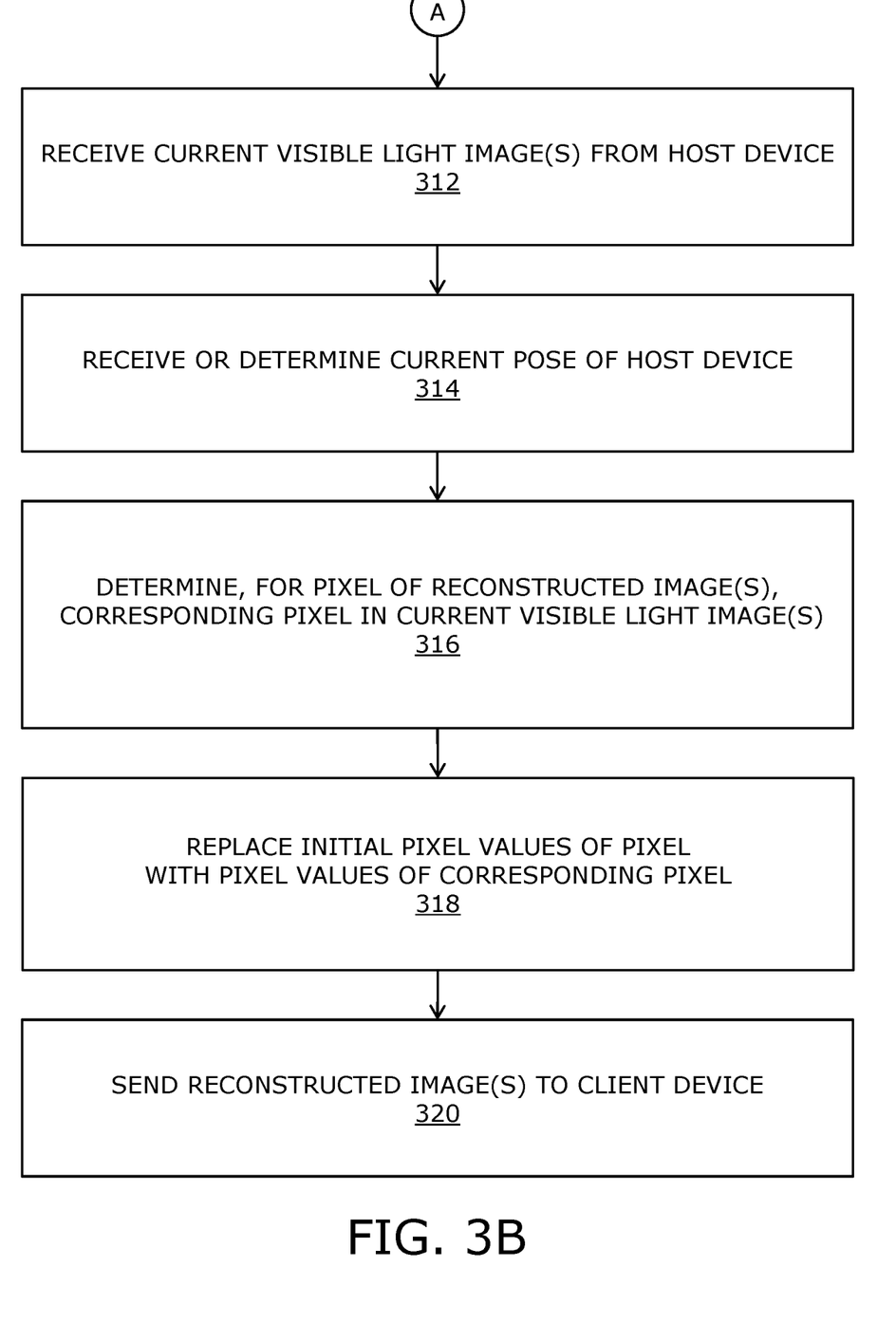

Referring to FIGS. 3A and 3B, illustrated are steps of a method, in accordance with an embodiment of the present disclosure. At step 302, a plurality of visible-light images of a real-world environment captured by at least one visible-light camera of the host device are received from a host device. At step 304, the plurality of visible-light images are processed to generate a three-dimensional environment model of the real-world environment, wherein the three-dimensional environment model is generated in a global coordinate space. At step 306, information indicative of a given pose of the client device in the global coordinate space, is received from a client device. At step 308, the three-dimensional environment model is utilised to generate at least one reconstructed image and at least one reconstructed depth map from a perspective of the given pose of the client device. At 310, a position of each pixel of the at least one reconstructed image in the global coordinate space is determined, based on the at least one reconstructed depth map and the given pose of the client device. At 312, at least one current visible-light image of the real-world environment captured by the at least one visible-light camera or at least one other visible-light camera of the host device is received from the host device. At step 314, information indicative of a current pose of the host device from which the at least one current visible-light image is captured, is received from the host device, or the current pose of the host device from which the at least one current visible-light image is captured, is determined from the at least one current visible-light image and the three-dimensional environment model, wherein the current pose of the host device is in the global coordinate space. At step 316, it is determined, for a given pixel of the at least one reconstructed image, whether or not a corresponding pixel exists in the at least one current visible-light image whose position in the global coordinate space matches with the position of the given pixel of the at least one reconstructed image, based on the current pose of the host device. When it is determined that the corresponding pixel exists in the at least one current visible-light image, at step 318, initial pixel values of the given pixel in the at least one reconstructed image are replaced with pixel values of the corresponding pixel in the at least one current visible-light image. At step 320, the at least one reconstructed image is sent to the client device for display thereat.

The steps 302, 304, 306, 308, 310, 312, 314, 316, 318, and 320 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system comprising at least one server configured to:
   receive, from a host device, a plurality of visible-light images of a real-world environment captured by at least one visible-light camera of the host device;
   process the plurality of visible-light images to generate a three-dimensional environment model of the real-world environment, wherein the three-dimensional environment model is generated in a global coordinate space;

receive, from a client device, information indicative of a given pose of the client device in the global coordinate space;

utilise the three-dimensional environment model to generate at least one reconstructed image and at least one reconstructed depth map from a perspective of the given pose of the client device;

determine, based on the at least one reconstructed depth map and the given pose of the client device, a position of each pixel of the at least one reconstructed image in the global coordinate space;

receive, from the host device, at least one current visible-light image of the real-world environment captured by the at least one visible-light camera or at least one other visible-light camera of the host device;

receive, from the host device, information indicative of a current pose of the host device from which the at least one current visible-light image is captured, or determine, from the at least one current visible-light image and the three-dimensional environment model, the current pose of the host device from which the at least one current visible-light image is captured, wherein the current pose of the host device is in the global coordinate space;

for a given pixel of the at least one reconstructed image, determine based on the current pose of the host device whether or not a corresponding pixel exists in the at least one current visible-light image whose position in the global coordinate space matches with the position of the given pixel of the at least one reconstructed image;

replace initial pixel values of the given pixel in the at least one reconstructed image with pixel values of the corresponding pixel in the at least one current visible-light image, when the corresponding pixel exists in the at least one current visible-light image; and send the at least one reconstructed image to the client device for display thereat.

2. The system of claim 1, wherein the at least one server is further configured to:

receive, from the host device, information indicative of corresponding poses of the host device from which the plurality of visible-light images are captured, wherein the corresponding poses of the host device are provided in the global coordinate space; and process the plurality of visible-light images to generate the three-dimensional environment model of the real-world environment, based on the corresponding poses of the host device.

3. The system of claim 1, wherein the at least one server is further configured to:

receive, from the host device, at least one of: a plurality of depth maps of the real-world environment, a set of phase images captured by at least one depth sensor of the host device with respect to corresponding poses of the host device from which the plurality of visible-light images are captured; and process the plurality of visible-light images to generate the three-dimensional environment model of the real-world environment, based on the at least one of: the plurality of depth maps, the set of phase images.

4. The system of claim 1, wherein the at least one server is further configured to:

receive, from the host device, at least one of: at least one current depth map of the real-world environment, at least one current phase image captured by at least one depth sensor of the host device with respect to the current pose of the host device from which the at least one current visible-light image is captured; and determine a position of each pixel of the at least one current visible-light image in the global coordinate space, based on the current pose of the host device and the at least one of: the at least one current depth map, the at least one current phase image.

5. The system of claim 1, wherein the at least one server is further configured to:

utilise the three-dimensional environment model to generate at least one current depth map from a perspective of the current pose of the host device; and determine, based on the at least one current depth map and the current pose of the host device, a position of each pixel of the at least one current visible-light image in the global coordinate space.

6. The system of claim 1, wherein the at least one visible-light camera comprises at least two visible-light cameras, and the at least one current visible-light image comprises at least two current visible-light images, wherein the at least one server is further configured to:

process the at least two current visible-light images to generate at least one current depth map from a perspective of the current pose of the host device; and determine a position of each pixel of the at least one current visible-light image in the global coordinate space, based on the at least one current depth map and the current pose of the host device.

7. The system of claim 1, wherein the at least one server is further configured to determine, for the given pixel of the at least one reconstructed image, whether or not a corresponding pixel exists in the at least one current visible-light image whose position in the global coordinate space matches with the position of the given pixel of the at least one reconstructed image, further based on at least one of: an extent of a field of view captured by the at least one visible-light camera or the at least one other visible-light camera, a mapping of a three-dimensional point in the three-dimensional environment model to a two-dimensional point in the at least one current visible-light image.

8. The system of claim 1, wherein the at least one server is further configured to leave the initial pixel values of the given pixel in the at least one reconstructed image unchanged, when no corresponding pixel exists in the at least one current visible-light image.

9. The system of claim 1, wherein the at least one server is further configured to:

modify the three-dimensional environment model to represent an extended-reality environment, by including at least one virtual segment representing at least one virtual object in the three-dimensional environment model, prior to utilising the three-dimensional environment model to generate the at least one reconstructed image and the at least one reconstructed depth map;

determine whether or not at least a part of the at least one virtual object is visible in the at least one reconstructed image;

when at least the part of the at least one virtual object is visible in the at least one reconstructed image, identify pixels representing at least the part of the at least one virtual object in the at least one reconstructed image; and skip an operation of replacing initial pixel values of the identified pixels in the at least one reconstructed image with pixel values of corresponding pixels in the at least one current visible-light image.

10. A method comprising:
receiving, from a host device, a plurality of visible-light images of a real-world environment captured by at least one visible-light camera of the host device;
processing the plurality of visible-light images to generate a three-dimensional environment model of the real-world environment, wherein the three-dimensional environment model is generated in a global coordinate space;
receiving, from a client device, information indicative of a given pose of the client device in the global coordinate space;
utilising the three-dimensional environment model to generate at least one reconstructed image and at least one reconstructed depth map from a perspective of the given pose of the client device;
determining, based on the at least one reconstructed depth map and the given pose of the client device, a position of each pixel of the at least one reconstructed image in the global coordinate space;
receiving, from the host device, at least one current visible-light image of the real-world environment captured by the at least one visible-light camera or at least one other visible-light camera of the host device;
receiving from the host information indicative of a current pose of the host device from which the at least one current visible-light image is captured, or determining, from the at least one current visible-light image and the three-dimensional environment model, the current pose of the host device from which the at least one current visible-light image is captured, wherein the current pose of the host device is in the global coordinate space;
for a given pixel of the at least one reconstructed image, determining based on the current pose of the host device whether or not a corresponding pixel exists in the at least one current visible-light image whose position in the global coordinate space matches with the position of the given pixel of the at least one reconstructed image;
replacing initial pixel values of the given pixel in the at least one reconstructed image with pixel values of the corresponding pixel in the at least one current visible-light image, when the corresponding pixel exists in the at least one current visible-light image; and
sending the at least one reconstructed image to the client device for display thereat.

11. The method of claim 10, further comprising:
receiving, from the host device, information indicative of corresponding poses of the host device from which the plurality of visible-light images are captured, wherein the corresponding poses of the host device are provided in the global coordinate space; and
processing the plurality of visible-light images to generate the three-dimensional environment model of the real-world environment, based on the corresponding poses of the host device.

12. The method of claim 10, further comprising receiving, from the host device, at least one of: a plurality of depth maps of the real-world environment, a set of phase images captured by at least one depth sensor of the host device with respect to corresponding poses of the host device from which the plurality of visible-light images are captured,
wherein the step of processing the plurality of visible-light images to generate the three-dimensional environment model of the real-world environment is performed based on the at least one of: the plurality of depth maps, the set of phase images.

13. The method of claim 10, further comprising:
receiving, from the host device, at least one of: at least one current depth map of the real-world environment, at least one current phase image captured by at least one depth sensor of the host device with respect to the current pose of the host device from which the at least one current visible-light image is captured; and
determining a position of each pixel of the at least one current visible-light image in the global coordinate space, based on the current pose of the host device and the at least one of: the at least one current depth map, the at least one current phase image.

14. The method of claim 10, further comprising:
utilising the three-dimensional environment model to generate at least one current depth map from a perspective of the current pose of the host device; and
determining, based on the at least one current depth map and the current pose of the host device, a position of each pixel of the at least one current visible-light image in the global coordinate space.

15. The method of claim 10, wherein the at least one visible-light camera comprises at least two visible-light cameras, and the at least one current visible-light image comprises at least two current visible-light images, wherein the method further comprises:
processing the at least two current visible-light images to generate at least one current depth map from a perspective of the current pose of the host device; and
determining a position of each pixel of the at least one current visible-light image in the global coordinate space, based on the at least one current depth map and the current pose of the host device.

16. The method of claim 10, wherein the step of determining, for the given pixel of the at least one reconstructed image, whether or not a corresponding pixel exists in the at least one current visible-light image whose position in the global coordinate space matches with the position of the given pixel of the at least one reconstructed image is performed further based on at least one of: an extent of a field of view captured by the at least one visible-light camera or the at least one other visible-light camera, a mapping of a three-dimensional point in the three-dimensional environment model to a two-dimensional point in the at least one current visible-light image.

17. The method of claim 10, further comprising leaving the initial pixel values of the given pixel in the at least one reconstructed image unchanged, when no corresponding pixel exists in the at least one current visible-light image.

18. The method of claim 10, further comprising:
modifying the three-dimensional environment model to represent an extended-reality environment, by including at least one virtual segment representing at least one virtual object in the three-dimensional environment model, prior to utilising the three-dimensional environment model to generate the at least one reconstructed image and the at least one reconstructed depth map;
determining whether or not at least a part of the at least one virtual object is visible in the at least one reconstructed image;
when at least the part of the at least one virtual object is visible in the at least one reconstructed image, identifying pixels representing at least the part of the at least one virtual object in the at least one reconstructed image; and skipping an operation of replacing initial pixel values of the identified pixels in the at least one reconstructed image with pixel values of corresponding pixels in the at least one current visible-light image.

* * * * *